(12) United States Patent
Fontecilla

(10) Patent No.: US 11,556,315 B2
(45) Date of Patent: Jan. 17, 2023

(54) METHODS AND SYSTEMS FOR OPERATIONALIZING ARTIFICIAL INTELLIGENCE MODELS USING WEB-BASED USER INTERFACES

(71) Applicant: DOVEL TECHNOLOGIES, LLC, McLean, VA (US)

(72) Inventor: Rod Fontecilla, McLean, VA (US)

(73) Assignee: GUIDEHOUSE INC., McLean, VA (US)

( * ) Notice: Subject to any disclaimer, the term of this patent is extended or adjusted under 35 U.S.C. 154(b) by 0 days.

(21) Appl. No.: 17/393,976

(22) Filed: Aug. 4, 2021

(65) Prior Publication Data

US 2022/0291904 A1    Sep. 15, 2022

Related U.S. Application Data

(63) Continuation of application No. 17/199,519, filed on Mar. 12, 2021, now Pat. No. 11,099,819.

(51) Int. Cl.
| | |
|---|---|
| G06F 8/35 | (2018.01) |
| G06F 3/04847 | (2022.01) |
| G06N 5/04 | (2006.01) |
| G06F 3/0482 | (2013.01) |
| G06F 16/953 | (2019.01) |
| G06F 9/451 | (2018.01) |
| G06N 20/00 | (2019.01) |
| G06F 21/57 | (2013.01) |

(52) U.S. Cl.
CPC .............. *G06F 8/35* (2013.01); *G06F 3/0482* (2013.01); *G06F 3/04847* (2013.01); *G06F 9/451* (2018.02); *G06F 16/953* (2019.01); *G06F 21/577* (2013.01); *G06N 5/04* (2013.01); *G06N 20/00* (2019.01); *G06F 2221/033* (2013.01)

(58) Field of Classification Search
CPC ........................................................ G06F 8/35
See application file for complete search history.

(56) References Cited

U.S. PATENT DOCUMENTS

| | | | |
|---|---|---|---|
| 8,307,279 B1 * | 11/2012 | Fioravanti | G06F 9/451 715/252 |
| 2014/0047341 A1 | 2/2014 | Breternitz | |
| 2014/0279747 A1 | 9/2014 | Strassner | |
| 2015/0074067 A1 * | 3/2015 | Crossley | G06F 16/219 707/695 |
| 2018/0300499 A1 * | 10/2018 | Agarwal | G06F 8/60 |
| 2019/0042887 A1 | 2/2019 | Nguyen | |
| 2019/0138555 A1 * | 5/2019 | Bequet | H04L 67/10 |
| 2020/0012743 A1 | 1/2020 | Tucker | |

(Continued)

*Primary Examiner* — Jae U Jeon
(74) *Attorney, Agent, or Firm* — Smith, Gambrell & Russell, LLP

(57) ABSTRACT

Systems and methods are described for operationalizing AI models using web-based user interfaces. The system may receive a first user input uploading of a software container, wherein the software container comprises a data model written in a first programming language. The system may generate for display, in a user interface of a web application, a prediction based on the data model, wherein the web application is written in a second programming language, and wherein the web application is configured to receive selection of the parameter and execute, in the software container, the data model.

24 Claims, 5 Drawing Sheets

(56) References Cited

U.S. PATENT DOCUMENTS

2020/0073717 A1* 3/2020 Hari ..................... G06F 9/5061
2020/0304526 A1   9/2020 Abraham
2020/0412769 A1* 12/2020 Yi ........................ H04L 63/205

* cited by examiner

METHODS AND SYSTEMS FOR OPERATIONALIZING ARTIFICIAL INTELLIGENCE MODELS USING WEB-BASED USER INTERFACES

CROSS-REFERENCE TO RELATED APPLICATION AND PRIORITY CLAIM

This application is a continuation of U.S. patent application Ser. No. 17/199,519, filed Mar. 12, 2021, which is incorporated herein in its entirety by reference.

BACKGROUND

Artificial Intelligence ("AI") has had an impressive surge over the past few years. Worldwide, data scientists are continually using a massive amount of data to discover new insights, create new revenue channels, decrease costs, or come up with advances in specific industries. Today, data scientists create AI models that, for example, help doctors identify cancerous cells, help retailers provide better customer service, and financial companies identify fraud. However, data scientists are struggling to bring these AI models into production to make them available to a larger population or show multiple results after selecting a model's parameters. As a result, AI models tend to stay hidden in data scientists' laptops or workstations and are not shared with a broader audience.

SUMMARY

In view of the aforementioned problems, methods and systems are described herein for operationalizing AI models using web-based user interfaces. These web-based user interfaces provide an intuitive mechanism for allowing data scientists to publicly release and/or utilize new AI models. For example, when developing new algorithms, data scientists conduct a time-intensive and mostly manual process to develop, test, and share their algorithms. During this time, the AI model may be hosted locally and in an environment that allows the data scientists to test their code on their local systems. Once the data scientists have a working prototype, the data scientists may convert working prototype from its native environment to a standalone script file that might have multiple input parameters and output products. At this point, for others to interact with the model, the data scientists must establish a cloud environment by either finding a hosting service to host their AI model or by developing their own code and hosting on their own servers. Given the requirements to convert an initial prototype to a standalone script as well as the need to transition to a cloud environment, the operationalizing of AI models, and in particular sharing these AI model publicly, presents significant technical challenges.

The methods and systems described herein overcome these technical challenges through the use of web-based user interfaces that facilitate the operationalizing of AI models. For example, the system provides an intuitive user interface to let data scientists present their models and results to several users selected by the data scientist or shared with the general public. Once the data scientists have developed and uploaded a model, the system creates a full webpage that is user-specific, customized, and configured per user preferences. However, the use of web-based user interfaces to facilitate the operationalizing of AI models is not without its own technical hurdles.

A first technical hurdle is the need to maintain a secure environment. For example, the reason that conventional systems do not use web-based user interfaces to facilitate the operationalizing of AI models is that operationalizing the AI models through such a public platform inherently raises security risks—both internally (e.g., an AI model currently being operationalized conducting unauthorized actions towards other AI models currently being operationalized and/or the system itself) and externally (e.g., external participants conducting unauthorized action towards AI models currently being operationalized and/or the system itself). A second technical hurdle is the need to allow data scientists and other users the ability to adjust the code for the AI model in an initial and/or native coding language familiar to users through the web-based user interface while still preserving the functionality (e.g., to adjust model parameters, maintaining cloud environment compatibility, etc.) provided by subsequent reformatting of the original AI model for different environments.

To overcome these technical hurdles, the methods and systems discussed herein recite the use of a specific architecture for operationalizing of AI models and in particular the use of container-based AI models to provide both security and web-based user interface functionality. In particular, the container-based AI models are individually validated for both security and functionality, with parameters being separately provided in order to ensure prediction effectiveness. The container-based AI models are then positioned within the cloud architecture to allow other components of the cloud architecture to ensure support for the web-based user interface functionality, while still allowing modifications to the AI models using the source code programming language native to the AI models.

In one aspect, systems and methods are described for operationalizing AI models using web-based user interfaces. The system may receive a first user input uploading of a software container, wherein the software container comprises a data model written in a first programming language. The system may perform a first validation of the software container, wherein the first validation comprises determining whether the software container comprises a security vulnerability. The system may receive a second user input submitting a parameter required to run the data model. The system may perform a second validation of the software container, wherein the second validation comprises determining whether the software container comprises all dependencies required to run the data model. The system may generate for display, in a user interface of a web application, a prediction based on the data model, wherein the web application is written in a second programming language, and wherein the web application is configured to receive selection of the parameter and execute, in the software container, the data model.

Various other aspects, features and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known models and devices are shown in block diagram form in order to avoid unnecessarily obscuring the embodiments of the invention. It should also be noted that the methods and systems disclosed herein are also suitable for applications unrelated to source code programming.

Figure 1:
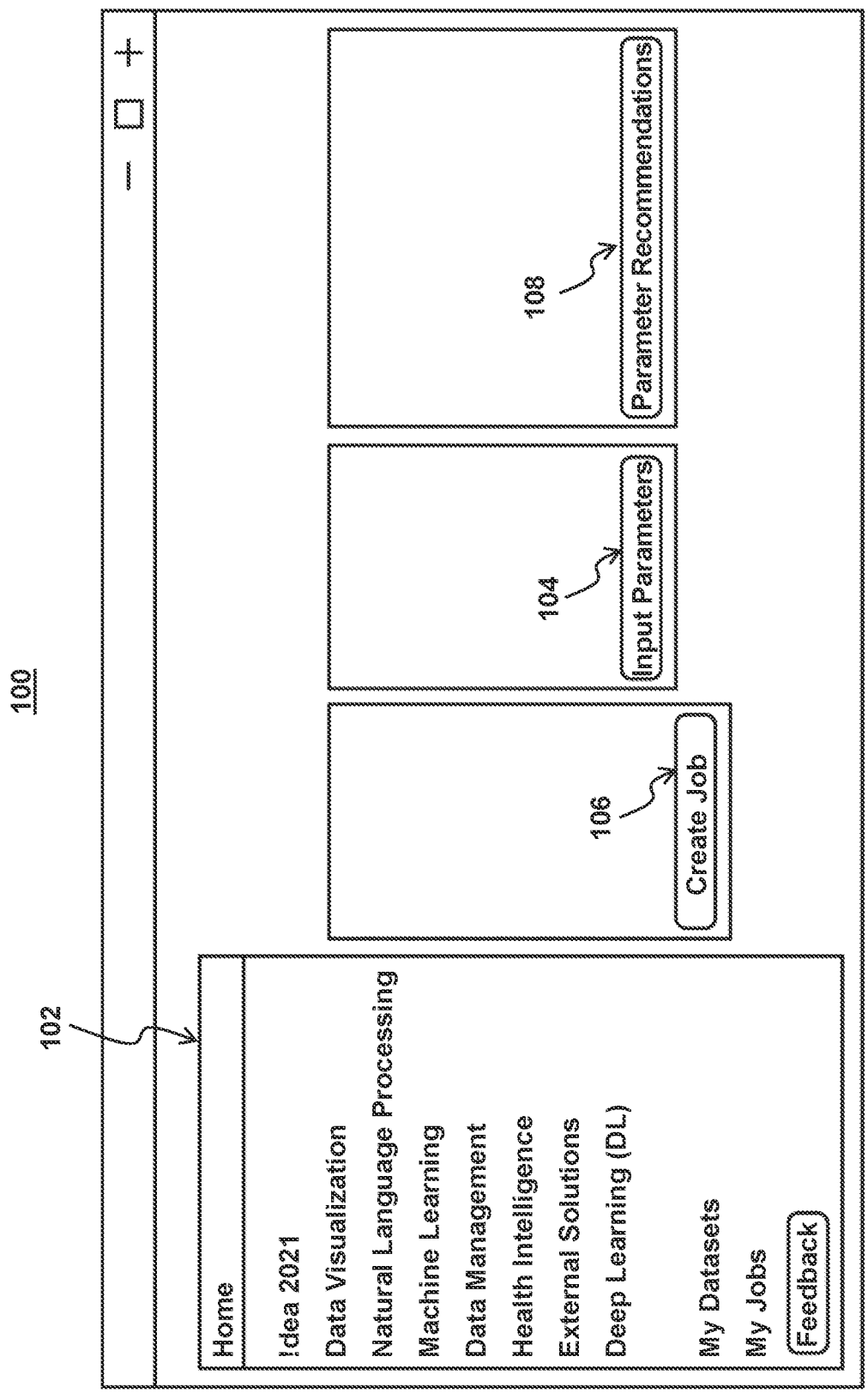
FIG. 1 shows an illustrative user interface for a web application for operationalizing AI models, in accordance with one or more embodiments.

FIG. 1 shows an illustrative user interface for a web application for operationalizing AI models, in accordance with one or more embodiments. For example, FIG. 1 shows user interface 100. User interface 100 may comprise a user interface generated for display by a web application (e.g., a web application used to operationalize AI models). It should be noted that user interface 100 may, in some embodiments, comprise a user interface generated for display by another type of application. For example, in some embodiments, the systems described herein may comprise multiple user interfaces (and/or instances of user interfaces) that present different content and/or facilitate different functions.

For example, a first user interface may receive initial content (e.g., a software container featuring a data model) and/or allow a user to upload the initial content to a cloud-based system. A second user interface may generate for display predictions based on a data model and/or allow a user to make modifications to the data model. It should be noted that these user interfaces, in some embodiments, may constitute the same user interface, different instances of the same user interfaces, or be generated by the same and/or different application, and/or be generated for display on the same and/or different device. As referred to herein, a "user interface" may comprise a human-computer interaction and communication in a device, and may include display screens, keyboards, a mouse, and the appearance of a desktop. For example, a user interface may comprise a way a user interacts with an application or a website. As referred to herein, "content" should be understood to mean an electronically consumable user asset, such as computer data, data models and/or simulations, predictions and/or recommendations based on data models and/or simulations, television programming, as well as pay-per-view programs, on-demand programs (as in video-on-demand (VOD) systems), Internet content (e.g., streaming content, downloadable content, Webcasts, etc.), video clips, audio, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. For example, in some embodiments, the system may display content related to a software container, a data model, and/or predictions based on a data model. Additionally or alternatively, the content may be interactive and allow a user to modify other content (e.g., a software container, a data model, and/or predictions based on a data model).

In some embodiments, alternative content may be personalized for a user, application, data model, software container, etc. For example, the system may receive original content (e.g., a parameter, data model, prediction format, etc.) and modify the original content based on a user preference as stored in a user profile to generate personalized content (e.g., a modified parameter, data model, prediction format, etc.). A user profile may be a directory of stored user settings, preferences, and information for the related user account. For example, a user profile may have the settings for the user's installed programs and operating system. In some embodiments, the user profile may be a visual display of personal data associated with a specific user, system, and/or a customized desktop environment. In some embodiments, the user profile may be digital representation of a person's identity. The data in the user profile may be generated based on the system actively or passively monitoring. It should be noted that as referred to herein, a "user" may refer to a single person (e.g., a particular data scientist), an entity (e.g., a company, data model provider), and/or descriptor (e.g., an account).

In some embodiments, the system may support multiple users with a role-based access security schema providing a unique environment for each user to store their models and/or the results of their experiments. For example, the system may restrict system, network, application, and/or data model access based on identities of users and/or roles of individual users within an entity. In some embodiments, the system may further modify the display characteristics and/or functions provided through user interface 100 based on the access allotted to a particular user. For example, the system may provide a role-based access security schema through a web application to limit and/or restrict access to content related to a software container. For example, the web application may limit options for modifying and/or running the model, stored in the software container, through the web application. Accordingly, the system may provide a role-based access security schema to the underlying data model without the need for the model to have any native a role-based access security schema.

For example, user interface 100 may include content having a plurality of sections and one or which may be populated based on characteristics of a user accessing user interface 100, a user case of a model/project, and/or functionality currently available. As referred to herein, a "section" may comprise any of the more or less distinct parts into which something the content may be divided or from which the content is made up. For example, a section may be distinguished from another section by one or more section characteristics. In user interface 100, the system may identify a section of the plurality of sections as having a section characteristic.

A section characteristic may comprise any characteristic that distinguishes one section from another. For example, a section characteristic may be media-related information (e.g., ordering, heading information, titles, descriptions, etc.), source code data (e.g., HTML, source code headers, etc.), category information, subject matter information, logo data, or other identifiers), media format, file type, object type, objects appearing in the content, or any other suitable information used to distinguish one section from another. In some embodiments, the section characteristic may also be human-readable text. The section characteristic may be determined to be indicative of the section being of interest to the user based on a comparison of the section characteristic and user profile data for the user.

For example, user interface 100 may include section 102. The system may identify section 102 based on a paragraph, section break, and/or an HTML tag. The system may parse the section for a content characteristic (e.g., content characteristic) and metadata describing the content characteristic, wherein the metadata indicates a context of the content characteristic, and wherein the content characteristic comprises human-readable text. For example, as shown in user interface 100, the system may identify content characteristic 104. As referred to herein, a "content characteristic" may comprise any of the more or less distinct parts into which something the section may be divided or from which the section is made up. For example, a content characteristic may be anything that may distinguish one content characteristic from another. In some embodiments, the content characteristic may be human-readable text. For example, the content characteristic may be a keyword, an image, an embedded object, etc. The system may generate a content map for the section based on the parsing, wherein the content map indicates a position of the content characteristic in the section. For example, the content map may include each content characteristic of a given section with the distances and/or positions indicated. For example, the system may determine a CSS position property for each characteristic. In another example, the system may use HTML absolute positioning to define a content map. In some embodiments, the content characteristics may define the type and/or effect of one or more user inputs. For example, in one section (e.g., defined by a window) a user input may result in modifications to source code of a data model in one programming language. In another section, (e.g., defined by another window) a user input may result in modifications to source code of a data model, entered via a web application, in another programming language.

Section 102 may include a plurality of options for performing one or more functions and/or retrieving content related to a model and/or project. Based on user selections in section 102, the system may generate one or more on-screen options (e.g., option 104, option 106, and/or option 108). For example, option 104 may correspond to creating a new data model and/or running a data model. Option 104 may correspond to inputting new parameters and/or defining parameters for a data model. For example, if parameters are required to run a data model, the system may allow a user to provide the names and types for each parameter. In case the parameter is a single selection pull-down or a multi-selection value, the system may allow a user to provide all valid values to run the model.

In some embodiments, user interface 100 and/or section therein may be separated into different pop-up windows to allow a user to select all the parameters previously defined and/or view data model predictions and/or results. For example, user interface 100 may allow a user to both interact with the web application and/or modify content of a data model (and/or software container) simultaneously. In some embodiments, the system may allow a user to edit a data model (e.g., in a first programming language (e.g., Python)) while accessing features (e.g., of the web application) that are generated by functions in a second programming language.

In some embodiments, once the system receives selections of parameters and/or a user has requested to run a data model (e.g., via option 104), the system may run the data model in the background in its container. Accordingly, the system may provide full functionality to the data model in its container while still allowing the user to interact with user interface 100, which may have a separate graphical user interface and/or functions based on a different programming language.

For example, the system may allow a user to view results of every run executed for a data model in a list format in a main window, while viewing the source code of the data model in another window. For example, each row of the list may show the run's title, the date run, and the run's status. The status may include "Success," "Failed," or "In Progress." Additionally or alternatively, there may be a section that provides additional details to the user on the right-hand side of the window. If there was an error and the run failed, then the full, user-friendly error message may be provided so the user can remediate those errors. The system may likewise provide operators for modifying the data model in the software container. For example, the system may provide deleting and editing options. The system may provide these via the web application (e.g., the functions may be based on a programming language of the web application), even though the effect of the operations is performed on the data model in the software container and in a different programming language. For example, user interface 100 may include icons for each row in the list: one to download the results of the run for successful experiments, and another is a "Delete" button to clear the row.

Figure 2:
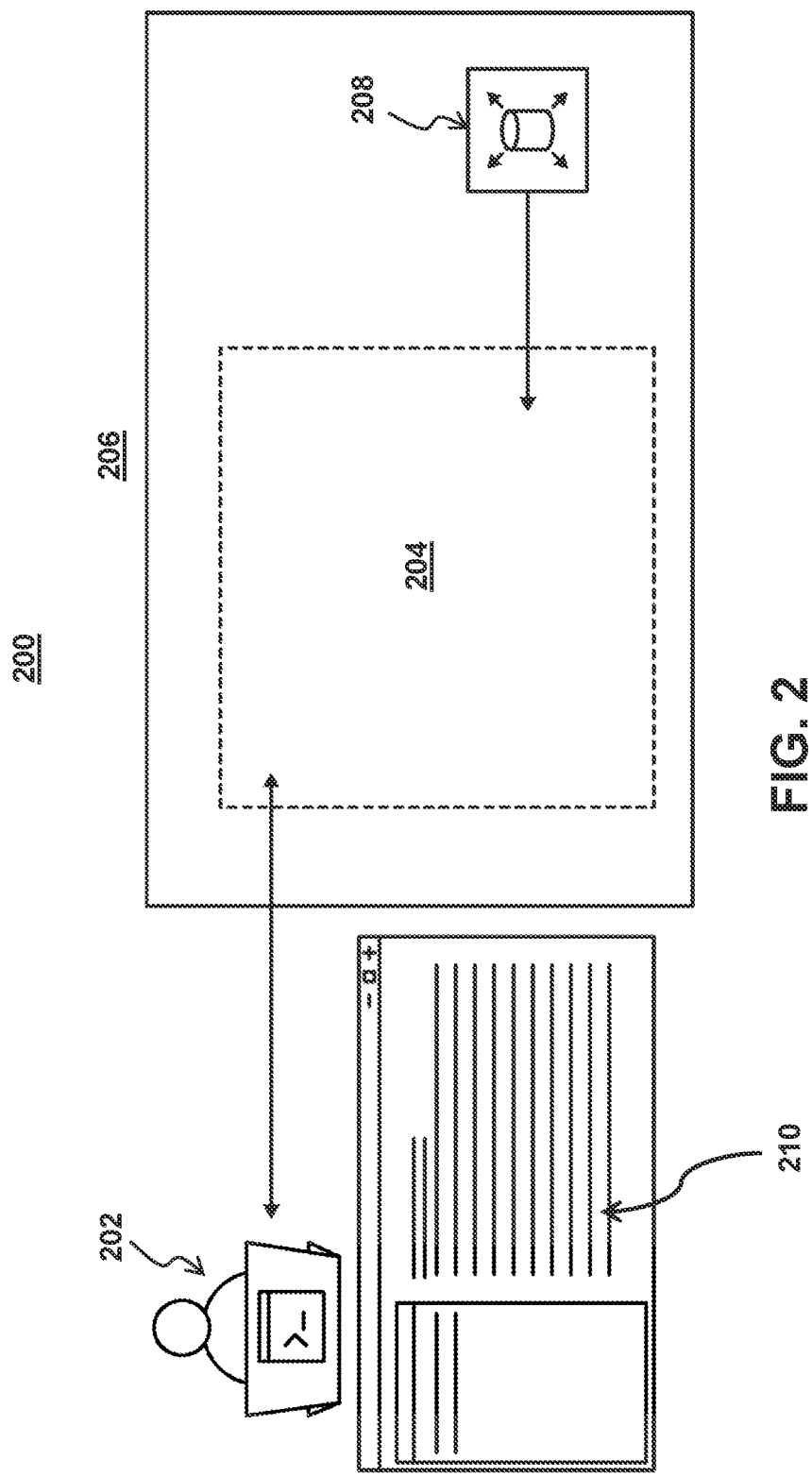
FIG. 2 shows another illustrative diagram for a process of operationalizing AI models using a web application, in accordance with one or more embodiments.

FIG. 2 shows another illustrative diagram for a process of operationalizing AI models using a web application, in accordance with one or more embodiments. For example, as shown in system 200, web application 206 may receive an upload of a data model in software container 204 from working environment 202. Software container 204 may then exist within an environment of web application 206 and/or receive data from data store 208.

For example, working environment 202 may include an interactive web tool (e.g., a computational notebook), which may be used by one or more users to combine software code, computational output, explanatory text and multimedia resources in a single document. The documents may include human-readable documents containing the analysis description and/or the results (e.g., figures, tables, etc.) as well as executable documents which may be run to perform data analysis. These documents may comprise the data model and/or other contents for supporting the data model. Working environment 202 may use one or more programming languages. As referred to herein, a "programming language" may comprise a formal language comprising a set of instructions that produce various kinds of output. For example, programming languages may be used in a computer programming to implement algorithms and/or create a data model. As referred to herein, a "data model" may comprise a computer program that is designed to simulate what might or what did happen in a situation.

In some embodiments, a data model may comprise artificial intelligence based models (e.g., a machine learning model, an artificial neural network, etc.). Model 210 may take inputs and provide outputs. The inputs may include multiple datasets such as a training dataset and a test dataset. Each of the plurality of datasets (e.g., inputs) may include data subsets related to user data, original content, and/or alternative content. In some embodiments, outputs may be fed back to model 210 as input to train model (e.g., alone or in conjunction with user indications of the accuracy of outputs, labels associated with the inputs, or with other reference feedback information). For example, the system may receive a first labeled feature input, wherein the first labeled feature input is labeled with a known alternative content for the first labeled feature input. The system may then train the first machine learning model to classify the first labeled feature input with the known alternative content.

In another embodiment, model 210 may update its configurations (e.g., weights, biases, or other parameters) based on the assessment of its prediction (e.g., outputs) and reference feedback information (e.g., user indication of accuracy, reference labels, or other information). In another embodiment, where model 210 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 210 may be trained to generate better predictions.

In some embodiments, model 210 may include an artificial neural network. In such embodiments, model 210 may include an input layer and one or more hidden layers. Each neural unit of model 210 may be connected with many other neural units of model 210. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 210 may be self-learning and trained, rather than explicitly programmed, and can perform significantly better in certain areas of problem solving, as compared to traditional computer programs. During training, an output layer of model 210 may correspond to a classification of model 210 and an input known to correspond to that classification may be input into an input layer of model 210 during training. During testing, an input without a known classification may be input into the input layer, and a determined classification may be output.

In some embodiments, model 210 may include multiple layers (e.g., where a signal path traverses from front layers to back layers). In some embodiments, back propagation techniques may be utilized by model 210 where forward stimulation is used to reset weights on the "front" neural units. In some embodiments, stimulation and inhibition for model 210 may be more free-flowing, with connections interacting in a more chaotic and complex fashion. During testing, an output layer of model 210 may indicate whether or not a given input corresponds to a classification of model 210 (e.g., alternative content).

Software container 204 may contain model 210 and/or other content. For example, software container 204 may comprise a package of code (e.g., for model 210) and all its dependencies so the application may run quickly and reliably from one computing environment to another (e.g., from an environment of working environment 202 to an environment of web application 206). For example, as describe herein a "container" may be a self-contained unit of software that includes all required aspects required to run the code (e.g., runtime, dependencies, settings, and other system tools) in a standalone unit. Because of their standalone nature, containers are lightweight, standardized, and the system may run them different operating systems regardless of infrastructure.

Web application 206 may be a software application that runs on a web server, although in some embodiments, web application 206 may run locally on the operating system of a device. Web application 206 may be accessed by a user through a web browser with an active network connection. In some embodiments, web application 206 may be a native application, which is developed specifically for a particular platform or device and installed on that device. In some embodiments web application 206 may comprise a cloud service.

The cloud service may be structured according to one or more service-oriented architecture models. For example, the cloud service may be designed to provide easy, scalable access to applications, resources and services, and are designed to be a fully managed cloud services provider. In particular, the cloud service may dynamically scale to meet the needs of a client, use case, and/or data model requirement. In some embodiments, the cloud service may supply some or all cloud resources (e.g., hardware and software necessary for all or some of the operation of one or more cloud services) to cloud services recipient. The cloud services provider may provide cloud services such as online data storage and backup solutions, Web-based e-mail services, hosted office suites and document collaboration services, database processing, managed technical support services, and/or general computer power and data processing. In some embodiments, the cloud resource may be a network, server, storage device, application and/or service. Notably, cloud service models may use a multitude of different formats each with their own benefits and weaknesses to both the cloud services provider and the cloud services recipient. In most models, these benefits and weaknesses are balanced based on the needs and/or business goals of the cloud services provider and the cloud services recipient.

For example, the cloud service may be structured according to an infrastructure as a service ("IaaS") model in which online services that provide high-level APIs used to dereference various low-level details of underlying network infrastructure like physical computing resources, location, data partitioning, scaling, security, backup etc. In such embodiments, a hypervisor runs the virtual machines as guests, and pools of hypervisors within the cloud operational system can support large numbers of virtual machines and the ability to scale services up and down according to the end users varying requirements. In such embodiments, where the client device may deploy and run arbitrary software, which can include operating systems and applications. While the client device does not manage or control the underlying cloud infrastructure, it may have control over operating systems, storage, and deployed applications. IaaS-cloud providers supply these resources on-demand from their large pools of equipment installed in data centers. For wide-area connectivity, customers can use either the Internet or carrier clouds (dedicated virtual private networks). To deploy their applications, cloud users install operating-system images and their application software on the cloud infrastructure. In this model, the end user patches and maintains the operating systems and the application software, and the end user has access to virtual machines, servers, storage, load balances, etc.

The cloud service may also be structured as an application platform as a service ("aPaaS") model. For example, by using aPaaS, the system may develop, run, and manage machine learning scripts without the complexity of building and maintaining the infrastructure. By using a modular approach and microservices, the system architecture may be implemented in a public or private cloud. In such embodiments, the cloud service deploys onto the cloud infrastructure consumer-created or acquired applications created using programming languages, libraries, services, and tools supported by the cloud services provider. The end user does not manage or control the underlying cloud infrastructure including network, servers, operating systems, or storage, but has control over the deployed applications and possibly the configuration settings for the application-hosting environment. In this model, the end users do not manage or control the underlying cloud infrastructure including network, servers, operating systems, or storage, but have control over the deployed applications and possibly configuration settings for the application-hosting environment, and the end user has access to execution runtime code, databases, web servers, development tools, etc.

Alternatively, the cloud service may also be structured as a software as a service ("SaaS") model. In such embodiments, the cloud service allows the end users to use the cloud services provider's applications running on a cloud infrastructure. The applications are accessible from various client devices through either a thin client interface, such as a web browser (e.g., web-based email), or a program interface. The end user does not manage or control the underlying cloud infrastructure, including network, servers, operating systems, storage, or even individual application capabilities, with the possible exception of limited user-specific application configuration settings.

Depending on the model or models used by the cloud services provider, the manner in which cloud services are apportioned may change. For example, in an aPaaS model, in order to apportion the cloud service resources, the cloud service may install one or more applications of the first cloud services recipient on hardware of a cloud services provider. In another example, in a SaaS model, in order to apportion the cloud service resources, the cloud service may set one or more limits for input/output operations per second for one or more applications of the first cloud services recipient.

Web application 206 overcomes technical challenges experienced in convention systems through the use of web-based user interfaces (e.g., user interface 100 (FIG. 1)) that facilitate the operationalizing of AI models. For example, the system provides an intuitive user interface (e.g., user interface 100 (FIG. 1)) to let users (e.g., a data scientist) present their models (e.g., model 210) and results to several users selected by the data scientist or shared with the general public (e.g., via access to user interface 100 (FIG. 1)). Once the data scientists have developed and uploaded a model (e.g., model 210), the system (e.g., web application 206) may create a full webpage (e.g., via access to user interface 100 (FIG. 1)) that is user-specific, customized, and configured per user preferences.

To maintain a secure environment at web application 206, the system may independently validate the software container 204. We application 206 also allows users adjust the code for the model (e.g., model 210) in an initial and/or native coding language familiar to the users (e.g., a language of working environment 202) through the web-based user interface (e.g., user interface 100 (FIG. 1)) while still preserving the functionality (e.g., to adjust model parameters, maintaining cloud environment compatibility, etc.) provided by subsequent reformatting of the original model for different environments (e.g., web application 206). Model 210 is then positioned within the cloud architecture of web application 206 to allow other components of the cloud architecture (e.g., data store 208) to ensure support for the web-based user interface functionality, while still allowing modifications to model 210 using the source code programming language native to working environment 202.

Figure 3:
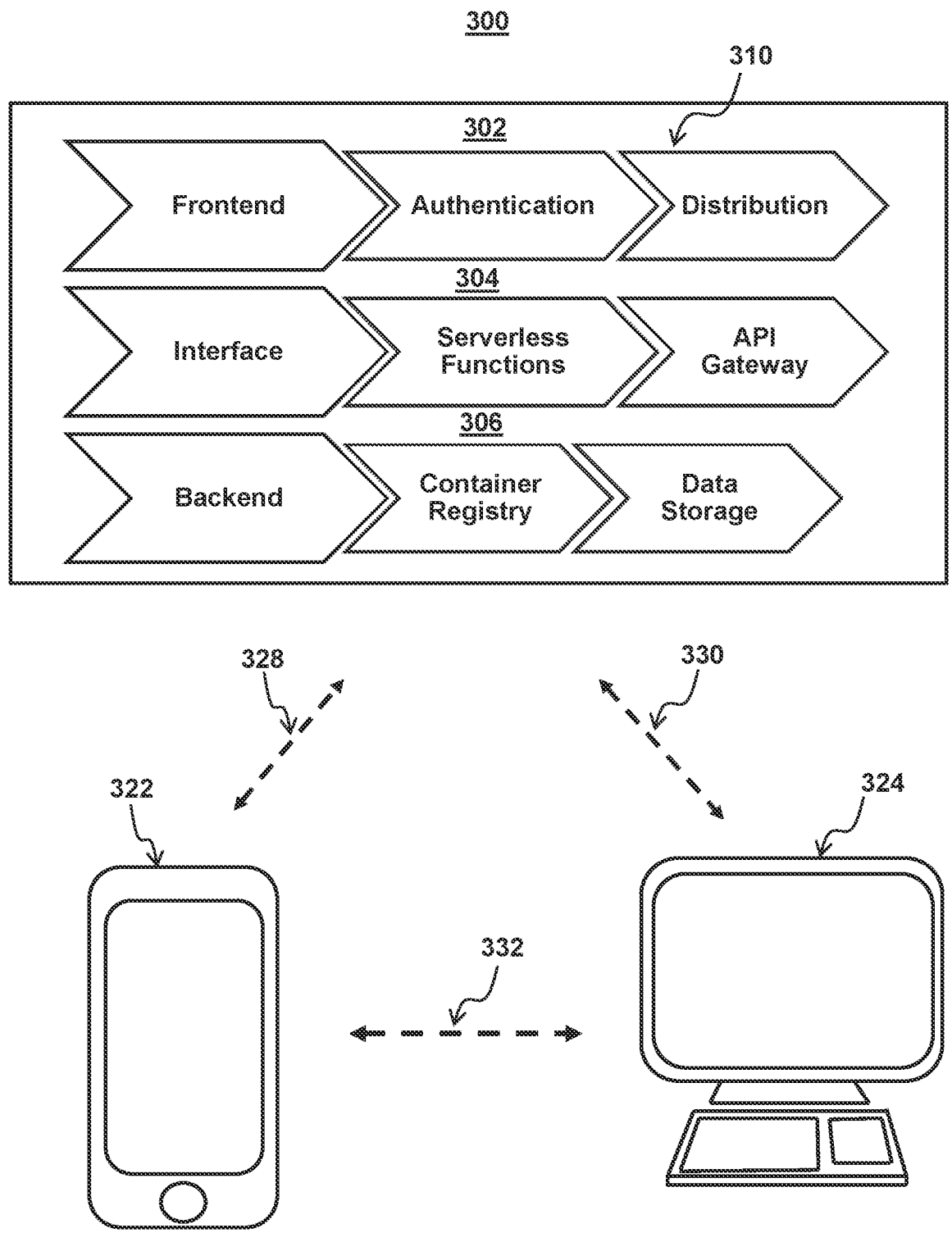
FIG. 3 shows illustrative system for operationalizing AI models using web-based user interfaces, in accordance with one or more embodiments.

FIG. 3 shows an illustrative system for operationalizing AI models using web-based user interfaces, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users, may, for instance, utilize one or more devices to interact with one another, one or more servers, or other components of system 300. It should be noted, that, while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., user interface 100 (FIG. 1)) for use in receiving and displaying data. For example, as shown in FIG. 3, both mobile device 322 and user terminal 324 include a display upon which to display data (e.g., predictions based on model 210 (FIG. 2)).

Additionally, as mobile device 322 is shown as a touchscreen smartphone, these displays also act as user input interfaces. It should be noted that in some embodiments, the devices may have neither user input interface, nor displays, and may instead receive and display content using another device (e.g., a dedicated display device, such as a computer screen, and/or a dedicated input device, such as a remote control, mouse, voice input, etc.). Additionally, the devices in system 300 may run an application (or another suitable program). The application may cause the processors and/or control circuitry to perform operations related to generating alternative content.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user, data model, and/or other information. For example, the database may include user data that the system has collected about the user through prior interactions, both actively and passively. Alternatively, or additionally, the system may act as a clearing house for multiple sources of information about the user, data model, and/or other information. This information may be compiled into a user profile. Cloud components 310 may also include control circuitry configured to perform the various operations needed to operationalize AI models using web-based user interfaces. For example, the cloud components 310 may include cloud-based storage circuitry configured to operationalize AI models and/or generate web-based user interfaces. Cloud components 310 may also include cloud-based control circuitry configured to runs processes to determine alternative content. Cloud components 310 may also include cloud-based input/output circuitry configured to display alternative content.

Cloud components 310 may include multiple layers (e.g., Frontend Layer 302, Interface Layer 304, and Backend Layer). It should be noted that the implementation of services defined in each layer may also be implemented using a different cloud provider. Frontend Layer 302 may include authentication and distribution/deployment services. For example, Frontend Layer 302 may utilize cloud-based microservices to implement user registration, authentication, and authorization. Distribution/deployment services may be managed using a Content Delivery Network ("CDN"). For example, a CDN is a geographically distributed network of servers and data centers that is designed to bring content to consumers quickly and securely. Instead of having massive datacenters in a few geographic locations, the system may use a CDN that consists of a more distributed platform of proxy servers that are located closer to consumers, thus decreasing latency and increasing performance for data consumers.

System 300 also includes Interface Layer 304. Interface Layer 304 may comprise a Application Programming Interface ("API"). Interface Layer 304 may act as a "front door" for applications to access data, business logic, and functionalities provided by the backend services. Interface Layer 304 may interact with Backend Layer 306 using a set of predefined APIs. In some embodiments, Interface Layer 304 may be implemented on mobile device 322 or user terminal 324. Alternatively or additionally, Interface Layer 304 may reside on one or more of cloud components 310.

Interface Layer 304 may perform multiple serverless functions. Serverless functions are programmatic functions that usually deployed and hosted on a managed infrastructure or public cloud. Access to these functions are managed by a set of RESTful APIs. A RESTful API is an architectural style that uses HTTP requests (GET, PUT, POST, DELETE) to perform data management functions. The system may use an API Gateway to implement the job scheduling functions. For each solution deployed on the system, users select a data source and submit a data modeling job. The defined serverless functions create the requires resources and deploy the related container and run the script. The output is then presented to the user.

Interface Layer 304 (which may be a REST or Web services API layer) may provide a decoupled interface to data and/or functionality of one or more applications. Interface Layer 304 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

Interface Layer 304 may use various architectural arrangements. For example, system 300 may be partially based on Interface Layer 304, such that there is strong adoption of SOAP and RESTful Web-services, using resources like Service Repository and Developer Portal but with low governance, standardization, and separation of concerns. Alternatively, system 300 may be fully based on Interface Layer 304, such that separation of concerns between layers like Interface Layer 304, services, and applications are in place.

In some embodiments, the system architecture may use a microservice approach. A microservice architecture ("microservices") is an architecture style that centers on building single-function software modules with well-defined interfaces and operations. Compared to "monolith" applications, which are built as autonomous units, applications built with microservices are composed of smaller chunks. As a result, microservices allow for greater flexibility for development teams to incorporate code changes and enhancements, and it lends itself well to the agile software development framework adopted by many leading technology companies.

System 300 may include Frontend Layer 302 and Backend Layer 306, where microservices reside, in this kind of architecture, the role of the Interface Layer 304 may provide integration between Frontend Layer 302 and Backend Layer 304. In such cases, Interface Layer 304 may use RESTful APIs (exposition to front-end or even communication between microservices). Interface Layer 304 may use AMQP (e.g., Kafka, RabbitMQ, etc.). Interface Layer 304 may use incipient usage of new communications protocols such as gRPC, Thrift, etc.

In some embodiments, the system architecture may use an open API approach. In such cases, Interface Layer 304 may use commercial or open source API Platforms and their modules. Interface Layer 304 may use a developer portal. Interface Layer 304 may use strong security constraints applying WAF and DDoS protection, and Interface Layer 304 may use RESTful APIs as standard for external integration.

Figure 4:
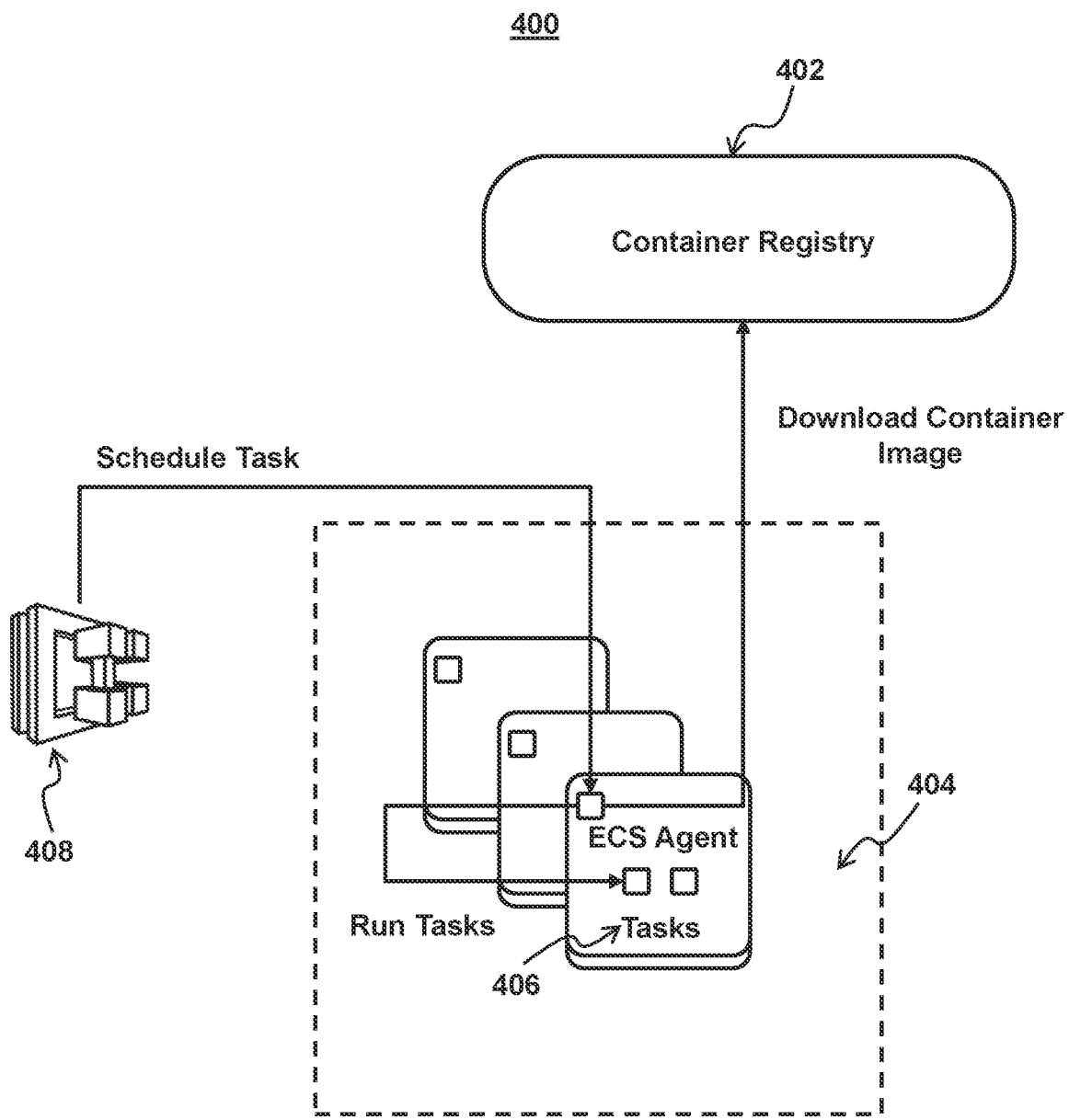
FIG. 4 shows an illustrative system for a software container registry, in accordance with one or more embodiments.

Backend Layer 306 may also include a container repository and data storage as described in FIG. 4. Backend Layer 306 may comprise the backend of web application 206 (FIG. 2) and enable dynamic scaling and the ability to add features as the system continuously modifies web application 206. The system may use a NoSQL database service that supports key-value and document data structures. The primary key may consist of a partition (hash) key and an optional sort (range) key. The primary key (partition and sort key together) identify each of the unique records (e.g., software container).

FIG. 4 shows an illustrative system for a software container registry, in accordance with one or more embodiments. FIG. 4 includes container repository 402. Container repository 402 is used to store, manage, share, and deploy the system's container images (e.g., container image 404) and artifacts. The system may use an Elastic Container Registry ("ECR") that is a fully managed service for storing container images (e.g., container image 404). The system may also use an Elastic Container Service ("ECS") as a fully managed container orchestration service (e.g., ECS 408). ECS 408 may schedule tasks and tasks may be run by ECS agent 406.

Figure 5:
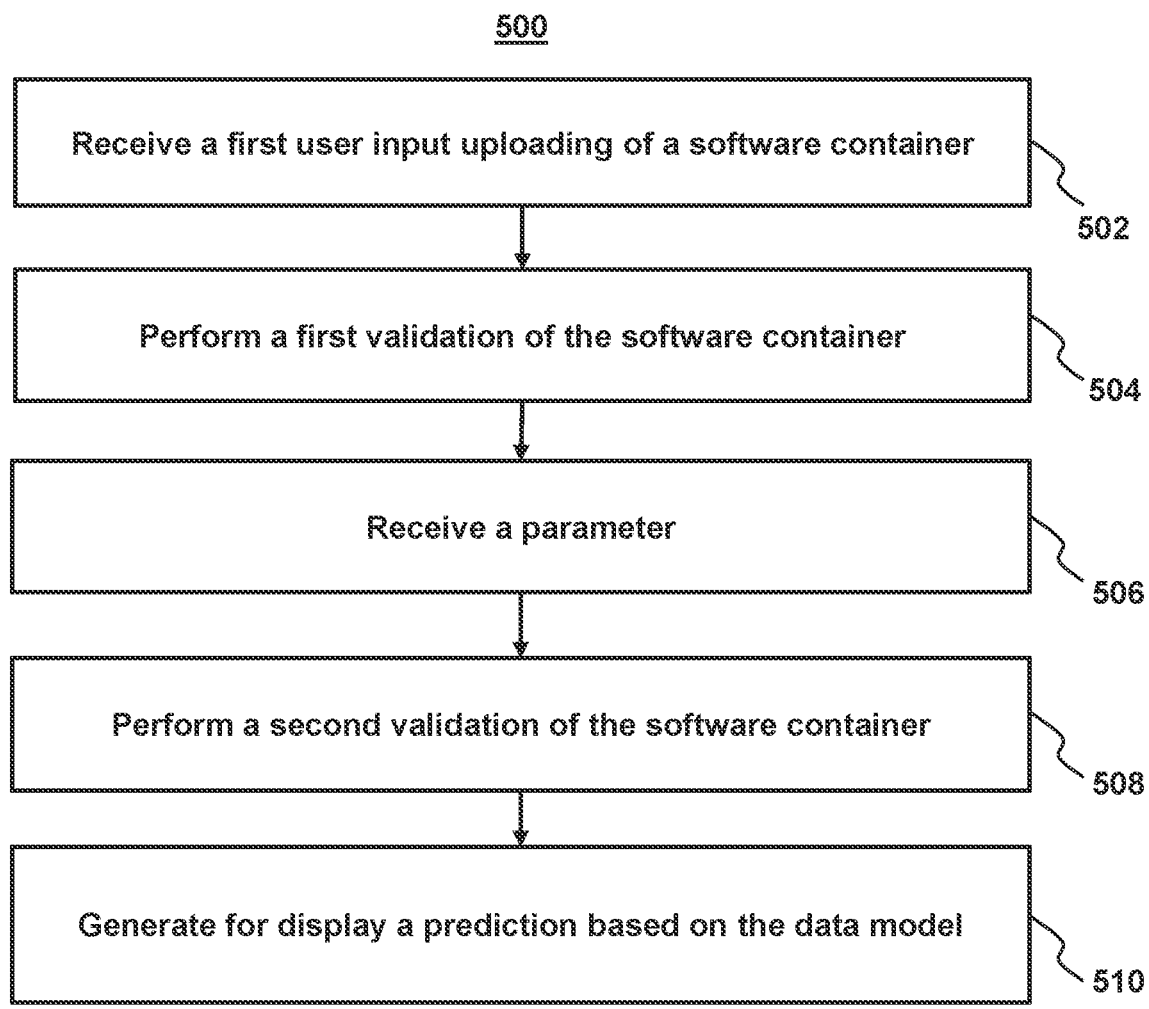
FIG. 5 shows a flowchart of the steps involved in operationalizing AI models using web-based user interfaces, in accordance with one or more embodiments.

FIG. 5 shows a flowchart of the steps involved in operationalizing AI models using web-based user interfaces, in accordance with one or more embodiments. For example, process 500 may represent the steps taken by one or more devices as shown in FIGS. 1-4 when operationalizing AI models using web-based user interfaces.

At step 502, process 500 receives (e.g., using control circuitry of one or more components of system 300 (FIG. 3)) a first user input uploading of a software container. For example, the system may receive (e.g., via a user interface 100 (FIG. 1)) a first user input uploading of a software container, wherein the software container comprises a data model written in a first programming language. In some embodiments, the uploading process may include downloading one or more applications and/or programs. For example, the system may download one or more programs for packaging the data model into a software container. For example, the one or more programs may isolate the data model from its environment and ensure that the data model works uniformly despite differences for instance between development and staging. By performing this step, the system may ensure that the data model operates within the web application. For example, by properly containerizing the data model in a software container, the system ensures that the software container includes an abstraction at the application layer that packages code and dependencies together. Furthermore, through the use of the system's software containers, multiple software containers may run on the same machine (e.g., via the web application) and may share an operating system kernel with other containers, each running as isolated processes in user space (e.g., a user space specific to each user, entity, data model, etc.). Additionally, through this process, the system ensures that software containers consume less space (e.g., container images may be only tens of MBs in size). Finally, the system ensures that more applications may be handled by the web application, and that fewer virtual machines, operating systems, and other resources are consumed.

Additionally or alternatively, the system may download one or more programs for providing secure authorization to the web application from the uploading device. For example, the system may allow users to make REST API calls from a client program, device, and/or via a web browser. During communications, the system may require predetermined certificates and/or tokens (e.g., previously generated and/or received during the upload process). For example, the system's infrastructure components may query for user-provided certificates generated by the system that contains identifiers for the user, and the infrastructure components that run in software containers may use a token associated with their user account (e.g., corresponding to a user, entity, authentication level, and/or data model) to connect to the API. Authorization may be is handled by a container platform policy engine, which may define actions and/or roles in a policy document. Roles are bound to users or groups by the user or group identifier. When a user attempts an action, the system may use the policy engine to check for one or more of the roles assigned to the user before allowing it to continue. As each container that runs on an administrative cluster is associated with an account, the system may authorize the pulling and pushing of data and/or edits, images, builds, and the deployment components based on the actions and roles assigned to the user.

At step 504, process 500 performs (e.g., using control circuitry of one or more components of system 300 (FIG. 3)) a first validation of the software container. For example, the system may perform a first validation of the software container, wherein the first validation comprises determining whether the software container comprises a security vulnerability. For example, by their nature, software containers create a lack of visibility into the content of the software containers. Accordingly, security teams are often unable to discern whether there are any issues within the code. The system may use a suite of on-demand, predetermined, and/or SaaS-based testing services to enable security analysis and testing to be embedded throughout the software development lifecycle (SDLC). The system may select the testing service based on the data model, application, and/or use case to test for vulnerabilities from inception through production.

At step 506, process 500 receives (e.g., using control circuitry of one or more components of system 300 (FIG. 3)) a parameter. For example, the system may receive (e.g., via a user interface 100 (FIG. 1)) a second user input submitting a parameter required to run the data model. For example, in response to determining that the software container does not comprise the security vulnerability, the system may determine whether the parameter is required to run the data model. In response to determining that the parameter is required to run the data model, the system may query a user for the parameter.

At step 508, process 500 performs (e.g., using control circuitry of one or more components of system 300 (FIG. 3)) a second validation of the software container. For example, the system may perform a second validation of the software container, wherein the second validation comprises determining whether the software container comprises all dependencies required to run the data model. For example, the dependencies may comprise one or more programs required to run the data model. Additionally or alternatively, the second validation further may comprise determining whether the software container generates expected results.

In some embodiments, in response to determining that the software container does not comprise all the dependencies required to run the data model, the system may query (e.g., via the web application) a user to re-upload the software container with all the dependencies required to run the data model. For example, the system may receive an upload of a software container via user interface 100 (FIG. 1)). Additionally or alternatively, in response to determining that the software container comprises the security vulnerability, the system may query (e.g., via the web application) a user to re-upload the software container without the security vulnerability.

At step 510, process 500 generate for display (e.g., using control circuitry of one or more components of system 300 (FIG. 3)) a prediction based on the data model. For example, the system may generate for display, in a user interface of a web application, a prediction based on the data model, wherein the web application is written in a second programming language, and wherein the web application is configured to receive selection of the parameter and execute, in the software container, the data model. For example, the system may generate for display, in the user interface of the web application, an option to select the parameter based on the second user input. The system may then receive, in the user interface of the web application, a third user input selecting the parameter. Additionally or alternatively, the system may receive, in the user interface of the web application, a fifth user input indicating a use case of the data model. The system may then select the parameter based on the use case.

Additionally or alternatively, the system may receive, in the user interface of the web application, a fourth user input to generate the prediction. The system may then execute, in the software container, the data model. For example, the system may receive a selection of option 106 in user interface 100 (FIG. 1)).

In some embodiments, the system may further perform features related to the data model. For example, the system may determine, by the web application, a hyperparameter for applying to the prediction. The system may then apply, in the software container, during execution of the data model, the hyperparameter. For example, a hyperparameter is a parameter whose value is used to control the learning process. The system may use the web application to further refine the training process of a data model in its container.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one of more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for operationalizing AI models using web-based user interfaces comprising generating for display, in a user interface of a web application, a prediction based on the data model, wherein the web application is written in a second programming language, and wherein the web application is configured to receive selection of the parameter and execute, in the software container, the data model.

2. A method for operationalizing AI models using web-based user interfaces, comprising: receiving a first user input uploading of a software container, wherein the software container comprises a data model written in a first programming language; performing a first validation of the software container, wherein the first validation comprises determining whether the software container comprises a security vulnerability; receiving a second user input submitting a parameter required to run the data model; performing a second validation of the software container, wherein the second validation comprises determining whether the software container comprises all dependencies required to run the data model; generating for display, in a user interface of a web application, a prediction based on the data model, wherein the web application is written in a second programming language, and wherein the web application is configured to receive selection of the parameter and execute, in the software container, the data model.

3. The method of claim 2, further comprising: generating for display, in the user interface of the web application, an option to select the parameter based on the second user input; and receiving, in the user interface of the web application, a third user input selecting the parameter.

4. The method of claim 2, further comprising: receiving, in the user interface of the web application, a fourth user input to generate the prediction; and executing, in the software container, the data model.

5. The method of claim 2, further comprising in response to determining that the software container does not comprise all the dependencies required to run the data model, querying a user to re-upload the software container with all the dependencies required to run the data model.

6. The method of claim 2, further comprising in response to determining that the software container comprises the security vulnerability, querying a user to re-upload the software container without the security vulnerability.

7. The method of claim 2, further comprising in response to determining that the software container does not comprise the security vulnerability, determining whether the parameter is required to run the data model; and in response to determining that the parameter is required to run the data model, querying a user for the parameter.

8. The method of claim 2, wherein the second validation further comprises determining whether the software container generates expected results.

9. The method of claim 2, wherein the dependencies comprise one or more programs required to run the data model.

10. The method of claim 2, further comprising: determining, by the web application, a hyperparameter for applying to the prediction; and applying, in the software container, during execution of the data model, the hyperparameter.

11. The method of claim 2, further comprising: receiving, in the user interface of the web application, a fifth user input indicating a use case of the data model; and selecting the parameter based on the use case.

12. A tangible, non-transitory, machine-readable medium storing instructions that, when executed by a data processing apparatus, cause the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

14. A system comprising means for performing any of embodiments 1-11.

15. A system comprising cloud-based circuitry for performing any of embodiments 1-11.

What is claimed is:

1. A system for integrating model development control systems and model validation platforms, comprising:
   one or more memory devices storing instructions; and
   one or more processors configured to execute the instructions to:
      receive a container input uploading of a software container, wherein the software container comprises executable code;
      perform a first validation of the software container, wherein the first validation comprises determining whether the software container comprises a security vulnerability;
      in response to determining that the software container does not comprise the security vulnerability, determining whether a first parameter is required for the executable code to execute;
      in response to determining that the first parameter is required for the executable code, querying, in a user interface of a web application, a user for the first parameter;
      receive, in the user interface of the web application, a first parameter input submitting the first parameter required for the executable code;
      perform a second validation, by the web application, of the software container, wherein the second validation comprises determining whether the software container comprises all aspects required for the executable code to execute and determining whether the software container generates expected results, and wherein the aspects comprise one or more programs required to execute the executable code;
      determine, by the web application, a second parameter for applying to the executable code;
      receive, in the user interface, a second parameter input requesting application of the second parameter;
      in response to the second parameter input, apply, by the web application, in the software container, during execution of the executable code, the second parameter;
      execute, in the software container; by the web application, the executable code; and
      generate for display, in the user interface of the web application, an output based on the executable code.

2. A method for operationalizing AI models using web-based user interfaces comprising:
   receiving a container input, wherein the container input comprises a software container further comprising executable code;
   performing a first validation to determine whether the software container comprises a security vulnerability;
   receiving a first parameter input submitting a first parameter that is required to execute the executable code;
   performing a second validation to determine whether the software container comprises all aspects required to execute the executable code; and
   in response to (i) the determination that the software container does not comprise the security vulnerability and (ii) the determination that the software container comprises all aspects required to execute the executable code, generating for display, an output based on the executable code, wherein the output is displayed via a web application and the web application is configured to receive the first parameter and execute in the software container.

3. The method of claim 2, further comprising:
   generating for display, in a user interface of the web application, an option to select the first parameter based on the first parameter input; and
   receiving, in the user interface of the web application, a selection input selecting the first parameter.

4. The method of claim 2, further comprising:
   receiving, in a user interface of the web application, a generative input to generate the output; and
   executing, in the software container, the executable code.

5. The method of claim 2, further comprising in response to determining that the software container does not comprise all aspects required to execute the executable code, querying a user to upload the software container with all aspects required to execute the executable code.

6. The method of claim 2, further comprising in response to determining that the software container comprises the security vulnerability, querying a user to upload the software container without the security vulnerability.

7. The method of claim 2, further comprising:
   in response to determining that the software container does not comprise the security vulnerability, determining whether the first parameter is required to execute the executable code; and
   in response to determining that the first parameter is required to execute the executable code, querying a user for the first parameter.

8. The method of claim 2, wherein the second validation further comprises determining whether the software container generates expected results.

9. The method of claim 2, wherein the aspects comprise one or more programs required to execute the executable code.

10. The method of claim 2, further comprising:
    determining, by the web application, a second parameter for applying to the executable code; and applying, in the software container, during execution of the executable code, the second parameter.

11. The method of claim 10, wherein the second parameter is a hyperparameter for applying to the executable code.

12. The method of claim 2, further comprising:
receiving, in a user interface of the web application, a use case input indicating a use case of the executable code; and
selecting the first parameter based on the use case.

13. The method of claim 2, wherein the first parameter is a value required to execute the executable code.

14. A non-transitory, computer-readable medium for integrating model development control systems and model validation platforms, comprising instructions that, when executed by one or more processors, cause operations comprising:
receiving a container input, wherein the container input comprises a software container further comprising executable code;
performing a first validation to determine whether the software container comprises a security vulnerability;
receiving a first parameter input submitting a first parameter that is required to execute the executable code;
performing a second validation to determine whether the software container comprises all aspects required to execute the executable code; and
in response to (i) the determination that the software container does not comprise the security vulnerability and (ii) the determination that the software container comprises all aspects required to execute the executable code, generating for display, an output based on the executable code, wherein the output is displayed via a web application and the web application is configured to receive the first parameter and execute in the software container.

15. The non-transitory, computer-readable medium of claim 14, further comprising:
generating for display, in a user interface of the web application, an option to select the first parameter based on the first parameter input; and
receiving, in the user interface of the web application, a selection input selecting the first parameter.

16. The non-transitory, computer-readable medium of claim 14, further comprising:
receiving, in a user interface of the web application, a generative input to generate the output; and
executing, in the software container, the executable code.

17. The non-transitory, computer-readable medium of claim 14, further comprising in response to determining that the software container does not comprise all aspects required to execute the executable code, querying a user to upload the software container with all aspects required to execute the executable code.

18. The non-transitory, computer-readable medium of claim 14, further comprising in response to determining that the software container comprises the security vulnerability, querying a user to upload the software container without the security vulnerability.

19. The non-transitory, computer-readable medium of claim 14, further comprising:
in response to determining that the software container does not comprise the security vulnerability, determining whether the first parameter is required to execute the executable code; and
in response to determining that the first parameter is required to execute the executable code, querying a user for the first parameter.

20. The non-transitory, computer-readable medium of claim 14, wherein the second validation further comprises determining whether the software container generates expected results.

21. The non-transitory, computer-readable medium of claim 14, further comprising:
determining, by the web application, a second parameter for applying to the executable code; and
applying, in the software container, during execution of the executable code, the second parameter.

22. The non-transitory, computer-readable medium of claim 21, wherein the second parameter is a hyperparameter for applying the executable code.

23. The non-transitory, computer-readable medium of claim 14, further comprising:
receiving, in a user interface of the web application, a use case input indicating a use case of the executable code; and
selecting the first parameter based on the use case.

24. The non-transitory, computer-readable medium of claim 14, wherein the first parameter is a value required to execute the executable code.

* * * * *